United States Patent
Wu

(10) Patent No.: US 11,748,787 B2
(45) Date of Patent: Sep. 5, 2023

(54) ANALYSIS METHOD AND SYSTEM FOR THE ITEM ON THE SUPERMARKET SHELF

(71) Applicant: Yi Tunnel (Beijing) Technology Co., Ltd., Beijing (CN)

(72) Inventor: Yili Wu, Beijing (CN)

(73) Assignee: YI TUNNEL (BEIJING) TECHNOLOGY CO., LTD., Beijing (CN)

( * ) Notice: Subject to any disclaimer, the term of this patent is extended or adjusted under 35 U.S.C. 154(b) by 391 days.

(21) Appl. No.: 16/764,059

(22) PCT Filed: Mar. 9, 2020

(86) PCT No.: PCT/CN2020/078471
§ 371 (c)(1),
(2) Date: May 14, 2020

(87) PCT Pub. No.: WO2021/179138
PCT Pub. Date: Sep. 16, 2021

(65) Prior Publication Data
US 2021/0279784 A1    Sep. 9, 2021

(51) Int. Cl.
*G06Q 30/0283* (2023.01)
*G06Q 30/0601* (2023.01)
(Continued)

(52) U.S. Cl.
CPC ..... *G06Q 30/0283* (2013.01); *G06Q 30/0623* (2013.01); *G06T 7/0008* (2013.01);
(Continued)

(58) Field of Classification Search
CPC ........... G06Q 30/0623; G06Q 30/0283; G06T 7/0008; G06T 7/70; G06T 2207/20081;
(Continued)

(56) References Cited

U.S. PATENT DOCUMENTS

2019/0236531 A1*  8/2019  Adato ............... G06V 20/20
2019/0370902 A1   12/2019  Yiin et al.

FOREIGN PATENT DOCUMENTS

CN  102930264 A   2/2013
CN  105095396 A   11/2015
(Continued)

OTHER PUBLICATIONS

International Search Report and Written Opinion issued in International Patent Application No. PCT/CN2020/078471 dated Apr. 29, 2020, 8 pp.

*Primary Examiner* — Hesham K Abouzahra
(74) *Attorney, Agent, or Firm* — Modal PLLC

(57) ABSTRACT

The present invention belongs to the technical field of visual identification, and discloses an analysis method and system for items on the supermarket shelf. The method comprises acquiring one shelf image, which contains the items on the supermarket shelf and price tags corresponding to the items, and one shelf image corresponds to one shooting angle; acquiring a primary item classification result corresponding to the items on the supermarket shelf and a primary price identification result corresponding to the price tag according to the shelf image, a pre-trained primary item classification model and price tag text identification model; displaying the primary item classification result and the primary price identification result on the shelf image. The system comprises an image acquisition device, a primary classification device and a display device. According to the above technical solutions, the present invention prevents the managers of the shopping place from consulting the item packaging one by one in front of the shelf when managing the item information on the shelf, and then recording the item information, thus improving the management efficiency and
(Continued)

facilitating the managers to know all the item information on the supermarket shelf at a glance.

9 Claims, 6 Drawing Sheets

(51) Int. Cl.
    *G06T 7/70*     (2017.01)
    *G06T 7/00*     (2017.01)
    *G06V 30/18*     (2022.01)
    *G06V 30/19*     (2022.01)
    *G06V 10/82*     (2022.01)
    *G06V 20/52*     (2022.01)
    *G06V 30/10*     (2022.01)
    *G06V 20/68*     (2022.01)

(52) U.S. Cl.
    CPC ............ *G06T 7/70* (2017.01); *G06V 10/82* (2022.01); *G06V 20/52* (2022.01); *G06V 30/18057* (2022.01); *G06V 30/19173* (2022.01); *G06T 2207/20081* (2013.01); *G06T 2207/20084* (2013.01); *G06T 2207/30128* (2013.01); *G06T 2207/30232* (2013.01); *G06V 20/68* (2022.01); *G06V 30/10* (2022.01)

(58) Field of Classification Search
    CPC . G06T 2207/20084; G06T 2207/30128; G06T 2207/30232; G06V 20/68; G06V 30/10; G06V 10/82; G06V 20/52; G06V 30/18057; G06K 9/6271
    See application file for complete search history.

(56) References Cited

FOREIGN PATENT DOCUMENTS

| | | |
|---|---|---|
| CN | 107679573 A | 2/2018 |
| CN | 108830147 A | 11/2018 |
| CN | 110322197 A | 10/2019 |
| CN | 110348293 A | 10/2019 |
| WO | 2020009670 A | 1/2020 |

\* cited by examiner

ANALYSIS METHOD AND SYSTEM FOR THE ITEM ON THE SUPERMARKET SHELF

BACKGROUND

Field of Invention

The present invention belongs to the technical field of visual identification (also called as vision identification), and particularly relates to an analysis method and system for the item on the supermarket shelf.

Background of the Invention

In supermarkets or shopping malls, there are usually a provided supermarket shelf (or called as a mall shelf or a supermarket shelf) on which items to be sold are placed. In order to better manage the items, it is necessary to know the information of the items on the supermarket shelf.

In the prior art, when a manager in a supermarket or a shopping mall manages items on a shelf, the manager firstly walks to the front of the shelf, and then checks and records the information of the items one by one, so that the manager can check the items with an item ledger. Due to the manager is required to be on site at the supermarket shelf and need to check the items one by one, result in the waste of labor, time-consuming and low management efficiency.

SUMMARY

In order to solve the above-mentioned problems, in one aspect, the present invention provides an analysis method for items on a supermarket shelf comprises: a step of image acquisition, acquiring one shelf image, wherein the shelf image contains items on the supermarket shelf and price tags corresponding to the items, and one shelf image corresponds to one shooting angle; a step of primary classification, acquiring a primary item classification result corresponding to the items on the supermarket shelf and a primary price identification result corresponding to the price tags according to the shelf image, a pre-trained primary item classification model and a pre-trained price tag text identification model, the primary item classification model is a model that is constructed by an image identification technique of a convolutional neural network and trained by all the items on the supermarket shelf, and the price tag text identification model is a model that is constructed by the image identification technique of the convolutional neural network and trained by the price tags corresponding to all the items on the supermarket shelf; a step of display, displaying the primary item classification result and the primary price identification result on the shelf image.

In the above-mentioned analysis method, preferably, after the step of acquiring the primary item classification result corresponding to the items on the supermarket shelf, the analysis method further comprises: acquiring an item price corresponding to the primary item classification result; judging whether the item price is consistent with the primary price identification result or not, and if not, sending a first reminder message.

In the above-mentioned analysis method, preferably, when the items on the supermarket shelf are fruit and fresh-items, after the step of primary classification, the analysis method further comprises: judging whether the primary item classification result is in a decayed state or not according to the shelf image and a pre-trained fruit and fresh-item decay model corresponding to the primary item classification result; if the primary item classification result is in the decayed state, sending a second reminder message; wherein the fruit and fresh-item decay model is a model that is constructed by the image identification technique of the convolutional neural network and trained by all the items in the decayed state on the supermarket shelf.

In the above-mentioned analysis method, preferably, after the step of primary classification, the analysis method further comprises: judging whether the items on the supermarket shelf are in a sold-out state or not according to the shelf image and a pre-trained empty shelf model; if the items on the supermarket shelf are in a sold-out state, sending a third reminder message.

In the above-mentioned analysis method, preferably, before the step of image acquisition, the analysis method further comprises: judging whether the number of the shooting angles is a plurality, and the plurality of shooting angles correspond to a plurality of the shelf images one by one; if so, sequentially executing the step of primary classification to each shelf image of the acquired plurality of shelf images to obtain the primary item classification result corresponding to the items on the supermarket shelf and the primary price identification result corresponding to the price tags in each shelf image, and acquiring a first-level item classification result and a first-level price identification result according to a plurality of primary item classification results, a plurality of primary price identification results, a pre-trained first-level item linear regression model and a pre-trained first-level price tag linear regression model, and displaying the first-level item classification result and the first-level price identification result on the shelf image; if not, skipping to the step of image acquisition.

In the above-mentioned analysis method, preferably, after acquiring the first-level item classification result and the first-level price identification result according to the plurality of primary item classification results, the plurality of primary price identification results and the pre-trained first-level linear regression model, the analysis method further comprises: judging whether the primary item classification result is a similar item or not; if the primary item classification result is a similar item, acquiring a secondary item classification result corresponding to the similar item according to the plurality of shelf images and a pre-trained second-level item classification model, and then acquiring a second-level item classification result corresponding to the similar item according to the plurality of secondary item classification results and a pre-trained second-level item linear regression model, the second-level classification model is a model that is constructed by the image identification technique of the convolutional neural network in advance and trained by all the similar items on the supermarket shelf; correspondingly, displaying the second-level item classification result and the first-level price identification result on the shelf image; if not, skipping to the step of display.

In another aspect, the present invention provides an analysis system for items on a supermarket shelf, wherein the analysis system comprising: an image acquisition device, used to acquire one shelf image, and the shelf image contains items on the supermarket shelf and price tags corresponding to the items, and one shelf image corresponds to one shooting angle; a primary classification device, used to acquire a primary item classification result corresponding to the items on the supermarket shelf and a primary price identification result corresponding to the price tag according to the shelf image, a pre-trained primary item classification model and a pre-trained price tag text identification model, the primary item classification model is a model that is constructed by an image identification technique of a convolutional neural network and trained by all the items on the supermarket shelf, and the price tag text identification model is a model that is constructed by the image identification technique of the convolutional neural network and trained by the price tags corresponding to all the items on the supermarket shelf; a display device, used to display the primary item classification result and the primary price identification result on the shelf image.

In the above-mentioned analysis system, preferably, the analysis system further comprises: a first reminder module, used to acquire an item price corresponding to the item classification result, and judge whether the item price is consistent with the primary price identification result or not, and if not, send a first reminder message.

In the above-mentioned analysis system, preferably, when the items on the supermarket shelf are fruit and fresh-items, the analysis system further comprises: a second reminder module, used to judge whether the primary item classification result is in a decayed state or not according to the shelf image and a pre-trained fruit and fresh-item decay model corresponding to the primary item classification result, and if the primary item classification result is in a decayed state, send a second reminder message, wherein the fruit and fresh-item decay model is a model that is constructed by the image identification technique of the convolutional neural network and trained by all the items in the decayed state on the supermarket shelf.

In the above-mentioned analysis system, preferably, which further comprises: a third reminder module, used to judge whether the items on the supermarket shelf are in a sold-out state or not according to the shelf image and a pre-trained empty shelf model, and if he items on the supermarket shelf are in a sold-out state, send a third reminder message.

In the above-mentioned analysis system, preferably, further comprises: a first judgment device used to judge whether the number of the shooting angle is a plurality, and the plurality of shooting angles correspond to the plurality of shelf images one by one; a first selection device used to execute a first-level classification device when the judgment of the first judgment device is yes, and execute the image acquisition device when the judgment of the first judgment device is no; wherein the first-level classification device used to sequentially execute the step of primary result acquisition to the acquired plurality of shelf image in each of the shelf image to obtain the primary item classification result corresponding to the items on the supermarket shelf and the primary price identification result corresponding to the price tag in each of the shelf image, and acquire a first-level item classification result and a first-level price identification result according to a plurality of primary item classification result, a plurality of primary price identification result, a pre-trained first-level item linear regression model and a pre-trained first-level price tag linear regression model, and display the first-level item classification result and the first-level price identification result on the shelf image;

In the above-mentioned analysis system, preferably, further comprises: a second judgment device used to judge whether the primary item classification result is a similar item or not; a second selection device used to execute the second-level classification device when the judgment of the second judgment device is yes, and execute the image acquisition device when the judgment of the second judgment device is no; wherein the second-level classification device used to is acquiring a secondary item classification result corresponding to the similar item according to the plurality of shelf images and a pre-trained second-level item classification model, and then acquiring a second-level item classification result corresponding to the similar item according to the plurality of secondary item classification results and a pre-trained second-level item linear regression model, the second-level classification model is a model that is constructed by the image identification technique of the convolutional neural network in advance and trained by all the similar items on the supermarket shelf.

The examples of the present invention bring the following beneficial effects by the above-mentioned technical solutions:

by acquiring the shelf image, then acquiring the primary item classification result corresponding to the items on the shelf and the primary price identification result corresponding to the price tag according to the shelf image, the pre-trained primary item classification model and the price tag text identification model, and displaying the primary item classification result and the primary price identification result on the shelf image, therefore, when managing the item information on the shelf, the manager of the shopping place are prevented from consulting the item packaging one by one in front of the shelf, and then recording the item information, thus improving the management efficiency, facilitating the manager to know all the item information on the supermarket shelf at a glance, and facilitating the management of all the items.

DETAILED DESCRIPTION OF THE EMBODIMENTS

In order to make objects, technical solutions and advantages of the present invention more apparent, the embodiments of the present invention will be further described in detail below in connection with the drawings.

The embodiments of the present invention will be described in detail below in connection with the drawings. Various examples are provided by way of explanation of the invention and are not intended to limit the present invention. In fact, it will be apparent to those skilled in the art that modifications and variations can be made in the present invention without departing from the scope or spirit thereof. For instance, features illustrated or described as part of one embodiment, can be used with another embodiment to yield a still further embodiment. Therefore, it is intended that the present invention encompass such modifications and variations as fall within the scope of the appended claims and their equivalents.

Figure 1:
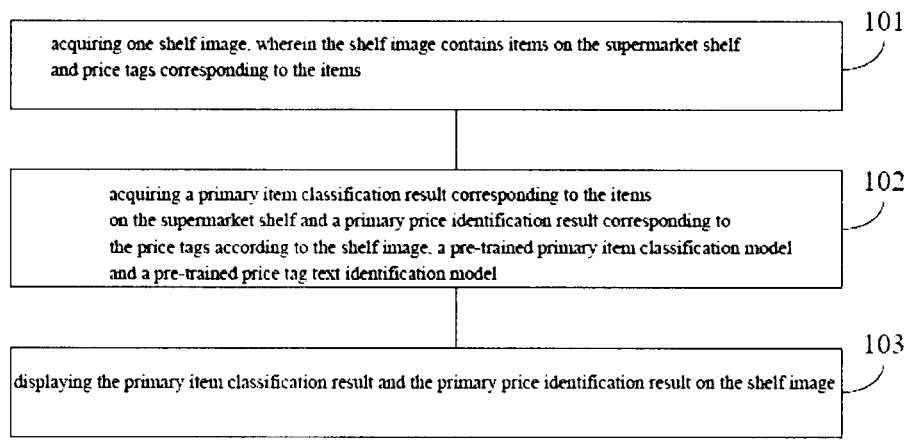
FIG. 1 is a schematic flowchart of an analysis method for items on a supermarket shelf provided in an example of the present invention.

With reference to FIG. 1, an embodiment of present invention provides an analysis method for items on a supermarket shelf, which comprises:

Step 101, i.e. a step of image acquisition: acquiring one shelf image, which contains the items on the supermarket shelf and price tags corresponding to the items. One shelf image corresponds to one shooting angle, and the price tag is a form in which merchants publish item prices to customers, which contains price information.

Step 102, i.e. a step of primary classification: acquiring a primary item classification result corresponding to the items on the supermarket shelf and a primary price identification result corresponding to the price tag according to the shelf image, pre-trained primary item classification model and price tag text identification model.

Wherein the primary item classification model is a model that is constructed by an image identification technique of a convolutional neural network and trained by all the items on the supermarket shelf, and the price tag text identification model is a model that is constructed by the image identification technique of the convolutional neural network and trained by the price tags corresponding to all the items on the supermarket shelf.

Step 103, i.e. a step of display; displaying the primary item classification result and the primary price identification result on the shelf image.

As the embodiment of present invention, by acquiring the shelf image, then acquiring the primary item classification result corresponding to the items on the supermarket shelf and the primary price identification result corresponding to the price tags according to the shelf image, the pre-trained primary item classification model and the price tag text identification model, and then displaying the primary item classification result and the primary price identification result on the shelf image, therefore, when managing the item information on the shelf, the manager of the shopping place are prevented from consulting the item packaging one by one in front of the shelf, and then recording the item information, thus improving the management efficiency, facilitating the manager to know all the item information on the supermarket shelf at a glance, and facilitating the management of all the items.

Figure 2:
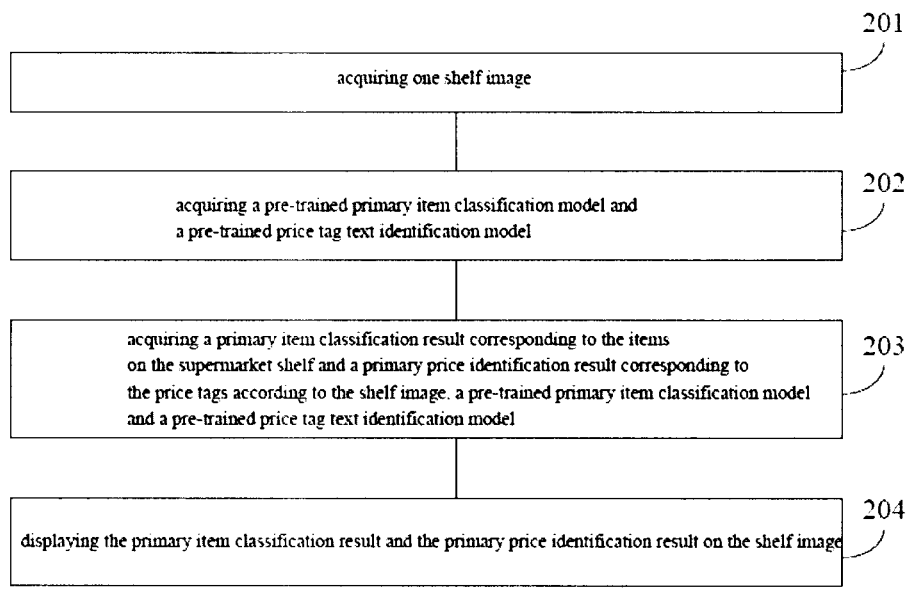
FIG. 2 is a schematic flowchart of an analysis method for items on a supermarket shelf provided in another example of the present invention.

With reference to FIG. 2, in connection with the above-mentioned embodiment, another embodiment of the present invention provides an analysis method for items on a supermarket shelf comprises:

Step 201, acquiring one shelf image.

Specifically, according to the placement of items on the supermarket shelf, the position of an image collection device is set, and the image collection device is used for photographing the items on the supermarket shelf and the price tags corresponding to the items to acquire the shelf image, which may be a camera. When the items on the supermarket shelf are placed in the form of a horizontal plane or a preset angle inclined relative to the horizontal plane, the image collection device is arranged above the supermarket shelf, and the items and the price tags are photographed from top to bottom. When the items on the supermarket shelf are placed in the form of a vertical plane, the image collection device is arranged in front of the supermarket shelf, and the items and price tags are photographed from the front of the supermarket shelf. In practical application, the position of the image collection device is adjusted so that the shooting area of the image collection device covers the items to be collected and the price tags corresponding to the items. The image collection device may be of a fixed structure, for example, the image collection device is fixed on a bracket above or in front of the supermarket shelf; it can also be a mobile structure, for example, the image collection device is a camera of a mobile terminal, and the mobile terminal can be a mobile phone or a tablet computer. The fixed structure is not only conducive to the analysis of the items on the shelf, but also convenient for real-time monitoring of the shelf.

Step 202, acquiring pre-trained primary item classification model and price tag text identification model.

Specifically, collecting data to establish a data set, the process of collecting data to establish a data set includes but is not limited to: 1) shooting all items on the shelf from each angle and in each attitude to acquire a great amount of items. 2) Then labeling these images, i.e., labeling positions, sizes and categories of the items and the positions, sizes and prices of the price tag in the image. The data included in the data set means the above-mentioned images and labels on those images. The primary item classification model is a model that is constructed by an image identification technique of a convolutional neural network and, which is trained by using data of all items on the supermarket shelf, and the training can be carried out in a gradient descent mode. The price tag text identification model is a model that is constructed by the image identification technique of the convolutional neural network and is trained by using price tag data corresponding to all items on the supermarket shelf, and the training can be carried out in a gradient descent mode.

Step 203, acquiring a primary item classification result corresponding to the items on the supermarket shelf and a primary price identification result corresponding to the price tags according to the shelf image, the pre-trained primary item classification model and price tag text identification model.

Specifically, perform target detection on the received shelf image, and during target detection, marked out an item target area corresponding to the items and a price tag target area corresponding to a corresponding price tag on the image, and the images corresponding to the target areas are respectively called as an item target area image and a price tag target area image. The shape of the target area may be rectangular or circular.

The trained primary item classification model classifies the item target area image, and a primary item classification result corresponding to each item is obtained, the primary item classification result is obtained by the following ways: the output of the model is an O-dimensional vector, wherein O represents the variety and the number of the items on the supermarket shelf, and the meaning of each element in the vector represents the probability that the items to be classified belong to each item in the O items predicted by the first-level item classification model. In practical applications, the items with the highest probability value are usually selected as the prediction result, i.e. as the primary item classification result.

The trained price tag text identification model identifies the price tag target area image, and obtains the primary price identification result corresponding to each price tag. Price information contained in price tags is typically composed of a number of digits and decimal points. The model predicts the probability that the number to be identified is for each number. In practical application, the number with the highest probability value is usually selected as the prediction result, so that the prediction of a plurality of numbers is realized, and the combination and decimal point of the numbers are used as the primary price identification result.

Step 204, displaying the primary item classification result and the primary price identification result on the shelf image.

Specifically, the item target area image and the price tag target area image are marked out on the shelf image, the primary item classification result is displayed in the vicinity of the item target area on the shelf image, and the primary price identification result is displayed in the vicinity of the price tag target area on the shelf image.

Figure 3:
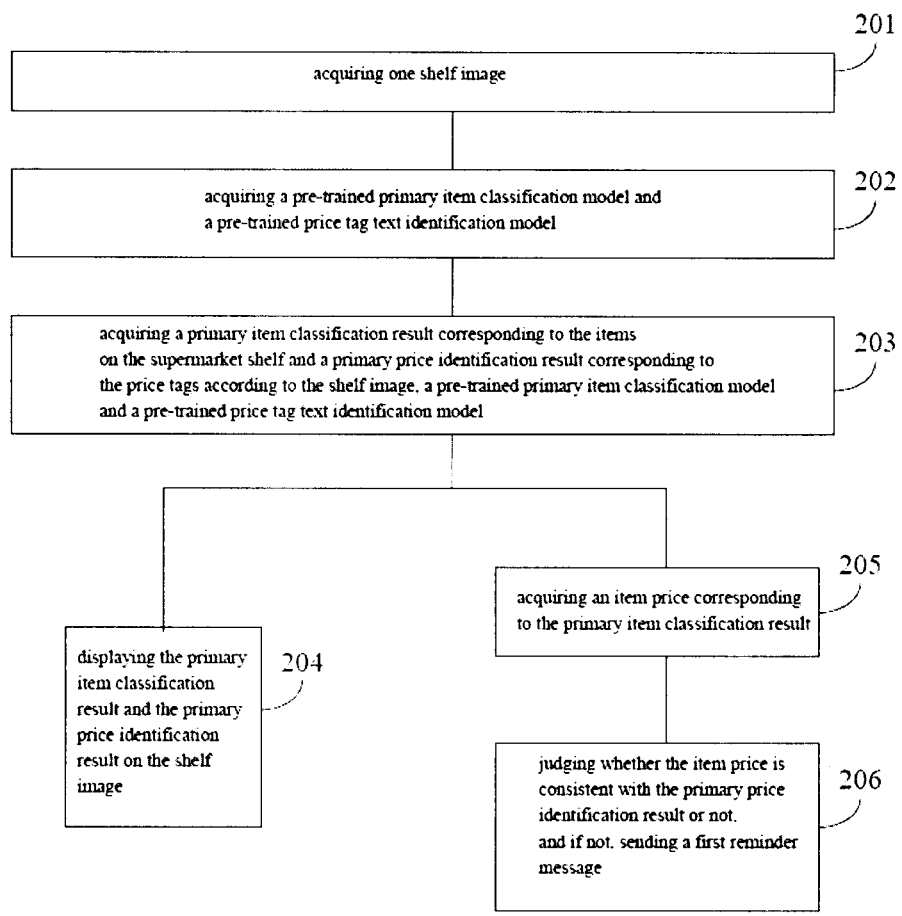
FIG. 3 is a schematic flowchart of another analysis method for items on a supermarket shelf provided in another example of the present invention.

In practical application, the price indicated by the price tag of the items will be inconsistent with the actual price of the items, which will make the shopping experience of customers unfriendly and cause losses to shopping malls or supermarkets, in order to facilitate manager to manage this situation, with reference to FIG. 3, after step 203, the analysis method further comprises:

Step 205, acquiring an item price corresponding to the primary item classification result.

Specifically, after purchasing the items in shopping places such as shopping malls or supermarkets, a price database of the items is established. Inquiring in a price database by taking the primary item classification result as an index to obtain the actual price corresponding to the primary item classification result.

Step 206, judging whether the item price is consistent with the primary price identification result or not, and if not, sending a first reminder message.

Specifically, after acquiring the item price, judging whether it is consistent with the primary price identification result, that is, judging whether the item price is the same as the primary price identification result or not, and if not, sending the first reminder message, the first reminder message represents that the price of the item is inconsistent, for example, the first reminder message can be sent out in a voice mode, which contain text contents, such as 'price of a certain item is inconsistent' and the like; it can also be an alarm sound, such as dripping; it can also be sent out in text form, such as a short message or a printed document; or in the form of graphical annotations, for example, displaying the primary price identification result on the shelf image, and displaying the price error near the result or labeling the result with a highlighted font or font color.

Figure 4:
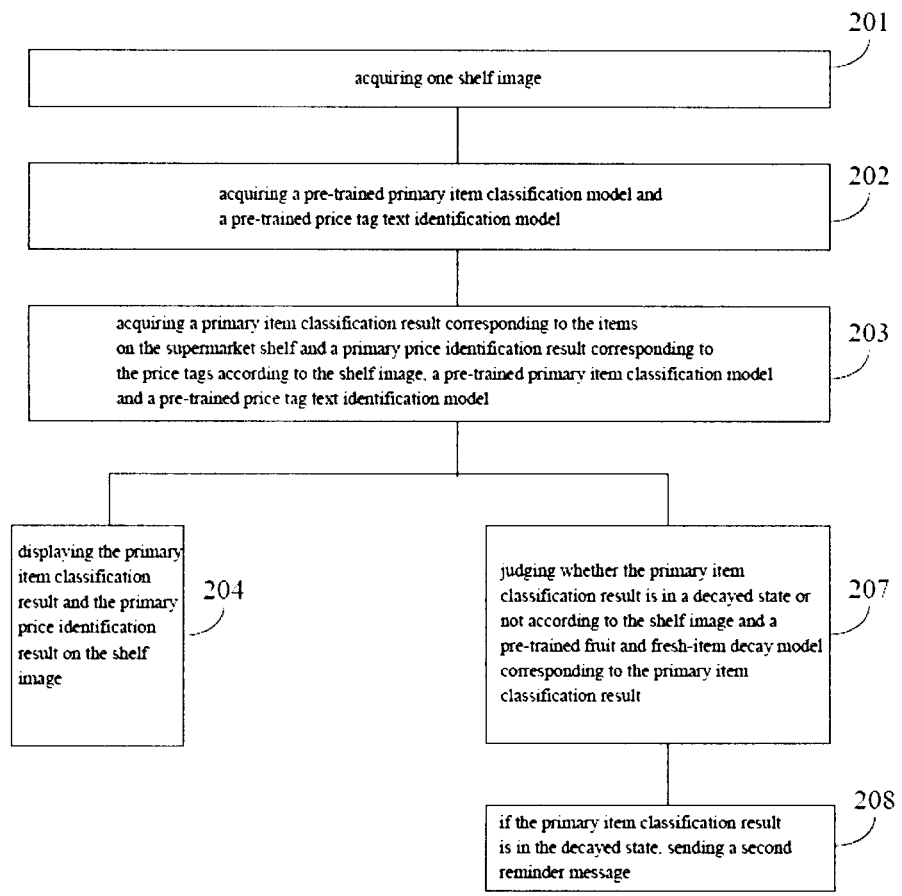
FIG. 4 is a schematic flowchart of still another analysis method for items on a supermarket shelf provided in another example of the present invention.

In practical application, there are various kinds of items placed on the supermarket shelf. When the items are fruit and fresh-items, the storage condition is harsh and the shelf life is short, so that the phenomenon of decay is very easy to occur during the selling period, the shopping experience of customers is affected, and if the items are not cleaned in time, the loss of shopping malls or supermarkets will be increased, in order to facilitate the management of a manager, as shown in FIG. 4, when the items on the supermarket shelf are fruit and fresh-items, after the step 203, the analysis method further comprises:

Step 207, judging whether the primary item classification result is in a decayed state or not according to the shelf image and a pre-trained fruit and fresh-item decay model corresponding to the primary item classification result.

Specifically, collecting data to establish a data set, the process of collecting data includes but is not limited to: 1) shooting the fruit and fresh-items in various decayed states from various shooting angles. 2) Then labeling these images. A fruit and fresh-item decay model is a model that is constructed by the image identification technique of the convolutional neural network and is trained by all the items in a decay state on the supermarket shelf. The training can be carried out in a gradient descent mode. And identifying the item target area image by using the fruit and fresh-item decay model, and then obtaining whether a first-level item classification result is in the decay state or not.

Step 208, if it is judged to be in a decay state, sending a second reminder message.

Specifically, after judging that the first-level item classification result is in the decay state, sending the second reminder message, which indicates that the items are in the decay state, for example, it can be sent out in a voice mode, which contains text contents, such as "so and so item is in the decayed state" and the like, it can also be an alarm sound, such as dripping; it can also be sent out in text form, such as a short message or a printed document; or it can also be sent out in the form of graphic annotations, such as displaying the primary item classification result on the shelf image, and displaying the decayed state near the result, or labeling the result with a highlighted font or font color.

Figure 5:
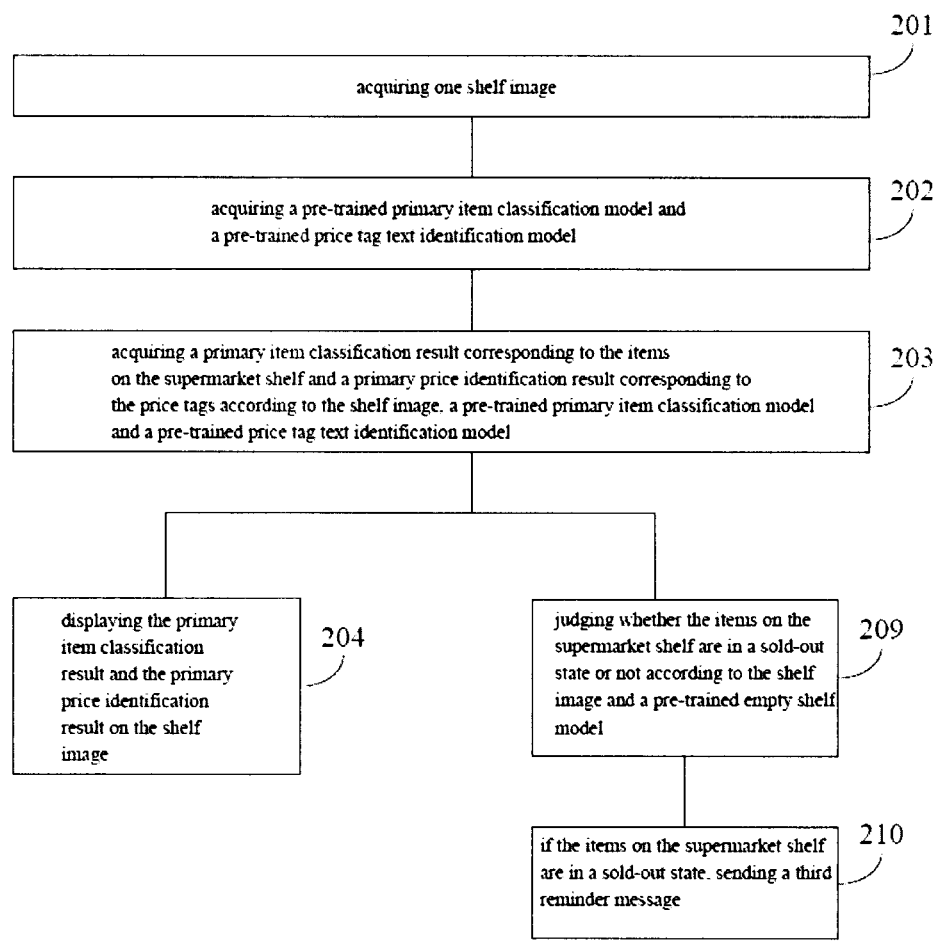
FIG. 5 is a schematic flowchart of yet another analysis method for items on a supermarket shelf provided in another example of the present invention.

In practical application, an item may be a hot-selling item, which is easy to be sold out compared with other items after it is placed on the supermarket shelf for a period of time, namely an sold-out phenomenon occurs, in order to remind manager to replenish the items in time, facilitate the customer to purchase again, and improve the customer's shopping experience, with reference to FIG. 5, the analysis method further comprises:

Step 209, judging whether the items on the supermarket shelf are in a sold-out state or not according to the shelf image and a pre-trained empty shelf model.

Specifically, collecting data to establish a data set, and the process of collecting data includes but is not limited to: 1) shooting shelf in various empty states from various shooting angles. 2) Then labeling these images. The empty shelf model is a model that is constructed by the image identification technique of the convolutional neural network and is trained by all supermarket shelves in the empty state. The training can be carried out in a gradient descent mode. And identifying the item target area image by using the empty shelf model and then obtaining whether the supermarket shelf is in the empty state or not.

Step 210, if it is judged to be in the sold out state, sending a third reminder message.

Specifically, after judging that the supermarket shelf is in the empty state, comparing the shelf image judged to be in the sold-out state with the shelf image in the non-sold-out state, determining an item target area image, then, the primary item identification result of the item target area image is used as the item in the sold-out state, and then sending out a third reminder message, which indicates that the supermarket shelf is in an empty state, for example, it can be sent out in a voice mode, which can contain text contents, such as "so-and-so shelf are in the empty state" and the like, it can also be an alarm sound, such as dripping. it can also be sent out in text form, such as short message or a printed document, it can also be sent out in the form of graphic annotations, such as displaying the primary item classification result on the shelf image and showing the empty state near the result.

As the embodiment of present invention, by acquiring the shelf image, then acquiring the primary item classification result corresponding to the items on the supermarket shelf and the primary price identification result corresponding to the price tag according to the shelf image, the pre-trained primary item classification model and the price tag text identification model, and then displaying the primary item classification result and the primary price identification result on the shelf image, therefore, when managing the item information on the shelf, the manager of the shopping place are prevented from consulting the item packaging one by one in front of the shelf, and then recording the item information, thus improving the management efficiency, facilitating the manager to know all the item information on the supermarket shelf at a glance, and facilitating the management of all the items.

Figure 6:
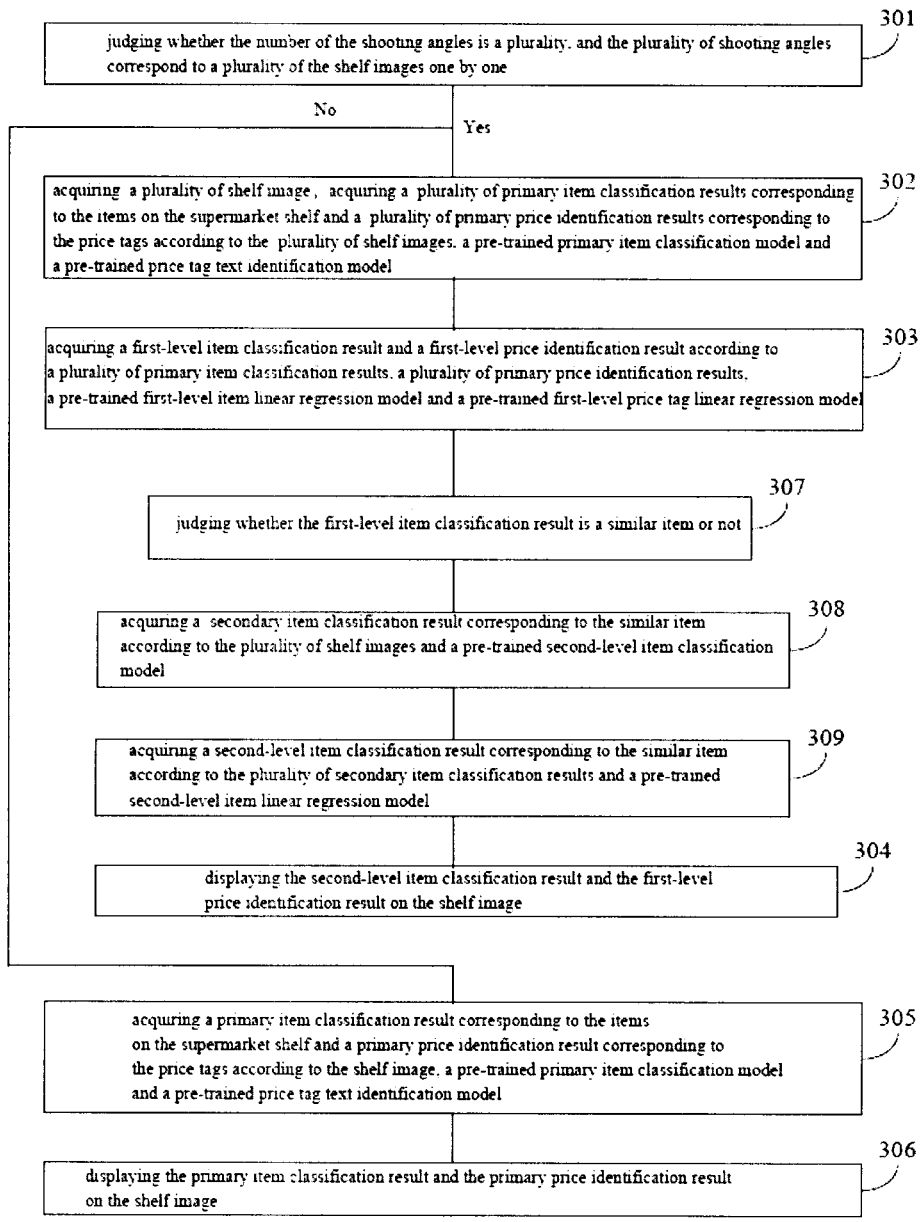
FIG. 6 is a schematic flowchart of an analysis method for items on a supermarket shelf provided in still another example of the present invention.

With reference to FIG. 6, in combination with the contents of the above-mentioned example, an example of the present invention further provides an analysis method for items on the supermarket shelf, which comprises:

Step 301, judging whether the number of the shooting angles are a plurality, and the plurality of shooting angles correspond to the plurality of shelf images one by one, if yes, executing steps 302-304, otherwise, executing steps 305-306.

Specifically, the image collection device takes pictures of the items and the price tags on the supermarket shelf at a certain shooting angle, thus acquiring one shelf image. As one shooting angle corresponds to one shelf image, changing the different shooting angles so that the shelf images corresponding to different shooting angles can be collected, thus improving the identification rate of the items and the price tag. Taking the image collection device as a camera as an example, the way to realize a plurality of shooting angles is illustrated: it is possible to arrange a plurality of cameras which correspond to a plurality of shooting angles one by one; and it is also possible to arrange N cameras, and realize a plurality of shooting angles by changing the positions and/or orientations of the cameras, where N is a positive integer greater than or equal to 1 and is less than the number of shooting angles. This example does not limit the realization mode of the plurality of shooting angles. It should be noted that each camera can be a camera located at the mobile end (i.e. a camera when moving), and can also be a camera located on a fixed bracket, or a camera located on a mobile bracket. The shooting angle in this article can refer to one factor of the shooting direction, and can also refer to two factors of the shooting direction and the shooting distance, or can also refer to other factors or other numbers of factors, which are not limited in this example.

In practical application, the number of shooting angles is determined according to the number of image collection devices configured on the work site, for example, when one image collection device is configured on the work site, the number of shooting angle is one; when the plurality of image collection devices are configured the work site, the number of shooting angles is a plurality.

Step 302, acquiring a plurality of shelf images, and acquiring a plurality of primary item classification result corresponding to the items on the shelf and a plurality of primary price identification result corresponding to price tags according to a plurality of the shelf images, the pre-trained primary item classification model and the price tag text identification model.

Specifically, the method of how to acquire the pre-trained primary item classification model and price tag text identification model and the method of how to acquire the primary item classification result and the primary price identification result can be referred to the relevant introduction of steps 202 and 203 of the above example respectively, and will not be repeated here. Since the number of shelf images is a plurality, a plurality of primary item classification results corresponding to each item are obtained, i.e. the number of primary item classification results is consistent with the number of the images, at this time, the primary item classification results are expressed by O-dimensional vectors, but not take the item with the highest selection probability value as the primary item classification results.

Step 303, acquiring a first-level item classification result and a first-level price identification result according to a plurality of primary item classification results, a plurality of primary price identification results, pre-trained first-level item linear regression model and pre-trained first-level price tag linear regression model.

Specifically, when training the primary item classification model, the primary item classification result output by the primary item classification model are taken as the input of the first-level item linear regression model, and the correct classification of items contained in the image corresponding to the primary item classification result is taken as the output of the first-level item linear regression model, so as to train the first-level item linear regression model. The trained first-level item linear regression model fuses the data of a plurality of primary item classification results of the items to obtain a first-level item classification result corresponding to the items, the first-level item classification result indicates which category of all the items on the supermarket shelf a certain item in the prediction image of the first-level item linear regression model is.

When training the price tag text identification model, the primary price identification result output by the price tag text identification model is taken as the input of the first-level price tag linear regression model, and the correct identification of the price contained in the image corresponding to the primary price identification result is taken as the output of the first-level price tag linear regression model to train the first-level price tag linear regression model. The trained first-level price tag linear regression model fuses the data of a plurality of primary price identification results of the price tag to obtain a first-level price identification result corresponding to the price tag, and the first-level price identification result indicates that how much price of a certain price tag in the prediction image of the first-level price tag linear regression model is.

An item target area image and a price tag target area image are marked out on the shelf image, and a first-level item classification result is displayed near the item target area in the shelf image, and a first-level price identification result is displayed near the price tag target area in the shelf image.

Step 304, displaying the first-level item classification result and the first-level price identification result on the shelf image.

Step 305, acquiring the primary item classification result corresponding to the items on the supermarket shelf and the primary price identification result corresponding to the price tag according to one shelf image, the pre-trained primary item classification model and price tag text identification model.

Step 306, displaying the primary item classification result and the primary price identification result on the shelf image.

The implementation method of step 305 can be referred to the related introduction of steps 202 and 203 of the above example, and the implementation method of step 306 can be referred to the related introduction of step 204 of the above example, which is not be repeated here.

Generally, there are many kinds of items on the supermarket shelf, and some items with similar appearance and easy confusion through vision exist in the various items, which are called as similar items, such as: Golden Delicious apples and yellow snowflake pears, or mineral water from one manufacturer and mineral water from another manufacturer. If a single item to be classified is a similar item, it is difficult for the primary item classification model to accurately classify the items, such as confusing Golden Delicious apple with yellow snowflake pear, and classifying Golden Delicious apple as yellow snowflake pear; The mineral water of this manufacturer is predicted to be the mineral water of another manufacturer, so in order to improve the identification accuracy, before step 304, the analysis method further comprises the following steps:

Step 307, judging whether the primary item classification result is the similar item or not, and if so, executing steps 308-309, otherwise executing the steps 305-306.

Specifically, sorting a plurality of similar items into a similar item table, searching in a preset similar item table after obtaining the primary item classification result, and judging that the primary item classification result is a similar item if the similar item matching the primary item classification result is found; and judging that the primary item classification result is not the similar item if no similar item matching the primary item classification result is found.

Step 308, acquiring a plurality of secondary item classification results corresponding to similar items according to a plurality of shelf images and the pre-trained second-level item classification model.

Specifically, the second-level item classification model is trained by using the data of similar items in the data set established in step 202 in the above example, and the training can be carried out in a gradient descent mode. The second-level item classification model is also a model that is constructed by the image identification technique of the convolutional neural network, and is different from the first-level item classification model in the data used in training, the data used by the first-level item classification model is the data of all the items on the supermarket shelf, and the data used by the second-level item classification model is the data of all the similar items on the supermarket shelf.

The trained second-level item classification model classifies the similar items in the item target area image to obtain a plurality of secondary item classification results corresponding to the similar items, each secondary item classification result is also a p-dimensional vector, the meaning of each element in the vector represents the probability that the second-level item classification model considers that the items to be classified belong to each of p similar items, p is less than or equal to O, and the p represents the total number of all the similar items on the supermarket shelf.

In practical application, all the similar items on the supermarket shelf are divided into a plurality of groups, for example, one group of the similar items comprises Golden Delicious apples and yellow snowflake pears, another group of the similar items comprises loose-packed salt and loose-packed white sugar; and yet another group of the similar items comprises soda and flour. One second-level item classification model can be trained for all the groups of the similar items. In order to further improve accuracy of item classification, one second-level item classification model is trained for each group of the similar item. At this point, if the first-level item classification result is the similar item, the second-level item classification model corresponding to the first-level item classification result is used.

Step 309, acquiring the second-level item classification result corresponding to the similar items according to a plurality of secondary item classification results and a pre-trained second-level item linear regression model.

At this time, step 304 executes accordingly: displaying the second-level item classification result and the first-level price identification result on the shelf image.

Specifically, when training the second-level item classification model, the secondary item classification result output by the second-level item classification model is used as the input of the second-level item linear regression model, and the correct classification of the items contained in the image corresponding to the secondary item classification result is used as the output of the second-level item linear regression model, so that the second-level item linear regression model is trained. The trained second-level item linear regression model fuses the data of a plurality of secondary item classification results corresponding to the similar items to obtain a second-level item classification result, which indicates which category of all the items on the supermarket shelf is the items in the second-level item linear regression model prediction image. Then display the second-level item classification result and the first-level price identification result on the shelf image.

The implementation methods of steps 308 to 309 can be referred to the relevant introductions of steps 201 to 204 of the above example, and are not be repeated here.

As the example of present invention judges the number of the shooting angles, acquires the shelf images with corresponding number according to the number of the shooting angles and correspondingly executes different processing procedures, therefore, when managing the item information on the shelf, the manager of the shopping place are prevented from consulting the item packaging one by one in front of the shelf, and then recording the item information, thus improving the management efficiency, facilitating the manager to know all the item information on the supermarkets shelf at a glance, and facilitating the management of all items.

Figure 7:
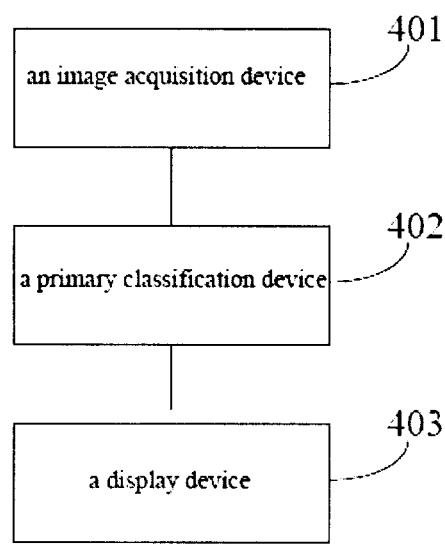
FIG. 7 is a structural schematic diagram of an analysis system for items on a supermarket shelf provided in still an example of the present invention.

With reference to FIG. 7, an example of the present invention provides an analysis system for items on the supermarket shelf, which is used for executing the analysis method provided by the above-mentioned examples, and comprises: an image acquisition device 401, a primary classification device 402 and a display device 403.

The image acquisition device 401 is used for acquiring a shelf image, wherein the shelf image comprises the items on the supermarket shelf and the price tag corresponding to the items. The primary classification device 402 is used for acquiring the primary item classification result corresponding to the items on the supermarket shelf and the primary price identification result corresponding to the price tag according to the shelf image, the pre-trained primary item classification model and price tag text identification model, wherein the primary item classification model is a model that is constructed by the image identification technique of the convolutional neural network and trained by all the items on the supermarket shelf, and the price tag text identification model is a model that is constructed by the image identification technique of the convolutional neural network and trained by the price tags corresponding to all the items on the supermarket shelf. The display device 403 is used for displaying the primary item classification result and the primary price identification result on the shelf image.

Preferably, the analysis system further comprises: a first reminder module, which is used for acquiring the item price corresponding to the primary item classification result, and judging whether the item price is consistent with the primary price identification result or not, and if not, sending the first reminder message.

Preferably, when the items on the shelf are the fruit and fresh-items, the analysis system further comprises: a second reminder module, which is used for judging whether the first-level item classification result is in the decayed state or not according to the shelf image and the fruit and fresh-item decay model corresponding to the pre-trained first-level item classification result; and if so, sending a second reminder message; wherein the fruit and fresh-item decay model is a model that is constructed by the image identification technique of the convolutional neural network and trained by all the items in a decayed state on the supermarket shelf.

Preferably, the analysis system further comprises: a third reminder module, which is used for judging whether the items on the supermarket shelf is in a sold-out state, and if so, sending a third reminder message.

Preferably, the analysis system further comprises: a first judgment device, which is used for judging whether the number of the shooting angles are a plurality, and a plurality of shooting angles correspond to a plurality of shelf images one by one. A first selection device used to execute the first-level classification device when the judgment of the first judgment device judges is yes, and execute the image acquisition device when the judgment of the first judgment device is no; wherein, the first-level classification device is used for acquiring a plurality of the shelf images, and acquiring a plurality of primary item classification result corresponding to the item on the supermarket shelf and a plurality of primary price identification result corresponding to the price tag according to a plurality of shelf images, the pre-trained primary item classification model and price tag text identification model, and acquiring the first-level item classification result and the first-level price identification result according to a plurality of primary item classification results, a plurality of primary price identification results, the pre-trained first-level item linear regression model and first-level price tag linear regression model, and displaying the first-level item classification result and the first-level price identification result on the shelf image.

Preferably, the analysis system further comprises: a second judgment device used to judge whether the primary item classification result is a similar item or not. A second selection device used to execute the second-level classification device when the judgment of the second judgment device is yes, and execute the image acquisition device when the judgment of the second judgment device is no; wherein the second-level classification device is used for acquiring the secondary item classification result corresponding to the similar item according to a plurality of shelf images and the pre-trained second-level item classification model, and acquiring the second-level item classification result corresponding to the similar item according to a plurality of secondary item classification results and the pre-trained second-level item linear regression model, the second-level classification model is a model that is constructed by the image identification technique of the convolutional neural network in advance and is trained by all the similar items on the supermarket shelf.

It should be noted that for specific descriptions of the image acquisition device 401, the primary classification device 402, the display device 403, the first judgment device, the first selection device, the first-level classification device, the second judgment device, the second selection device, the second-level classification device, the first reminder module, the second reminder module, and the third reminder module, reference may be made to relevant contents of steps 101 to 103, steps 201 to 210, and steps 301 to 310 in the above examples, and are not be repeated here.

An example of the present invention provides an analysis system for items on the supermarket shelf, comprises: an image collection device, a processor and a memory.

Wherein the image collection device is used for acquiring the shelf images, and the shelf images contains the items on the supermarket shelf and the price tags corresponding to the items. The memory is used for storing instructions executable by the processor. The processor is configured to: acquiring a primary items classification result corresponding to the items on the supermarket shelf and a primary price identification result corresponding to the price tags according to a shelf image, a pre-trained primary items classification model and price tag text identification model, wherein the primary items classification model is a model that is constructed by the image identification technique of the convolutional neural network and trained by all the items on the supermarket shelf, and the price tag text identification model is a model that is constructed by the image identification technique of the convolutional neural network and trained by the price tags corresponding to all items on the supermarket shelf; displaying the primary item classification result and the primary price identification result on the shelf image. For specific description of the image collection device and the processor, reference may be made to the related contents of steps 101 to 103, steps 201 to 210, and steps 301 to 310 in the above examples, and are not be repeated here.

In summary, the examples of the present invention bring the following beneficial effects:

By acquiring the shelf image, then acquiring the primary item classification result corresponding to the items on the shelf and the primary price identification result corresponding to the price tag according to the shelf image, the pre-trained primary item classification model and price tag text identification model, and displaying the primary item classification result and the primary price identification result on the shelf image, therefore, when managing the item information on the shelf, the manager of the shopping place are prevented from consulting the item packaging one by one in front of the shelf, and then recording the item information, thus improving the management efficiency, facilitating the manager to know all the item information on the supermarkets shelf at a glance, and facilitating the management of all the items.

It can be known from common technical knowledge that the present invention can be implemented by other embodiments without departing from the spirit essence or necessary characteristics of the present invention. Therefore, the above-mentioned disclosed embodiments, in all aspects, merely are used for illustration rather than limitation. All changes made in the scope of the present invention or the scope equivalent to the present invention shall fall within the present invention.

What is claimed is:

1. An analysis method for items on a supermarket shelf comprising:
   a step of image acquisition acquiring one shelf image, wherein the shelf image contains items on the supermarket shelf and price tags corresponding to the items, and one shelf image corresponds to one shooting angle;
   a step of primary classification acquiring a primary item classification result corresponding to the items on the supermarket shelf and a primary price identification result corresponding to the price tags according to the shelf image, a pre-trained primary item classification model and a pre-trained price tag text identification model, the primary item classification model is a model that is constructed by an image identification technique of a convolutional neural network and trained by all the items on the supermarket shelf, and the price tag text identification model is a model that is constructed by the image identification technique of the convolutional neural network and trained by the price tags corresponding to all the items on the supermarket shelf;

a step of display displaying the primary item classification result and the primary price identification result on the shelf image;

before the step of image acquisition, the analysis method further comprises:

judging whether a number of shooting angles of the supermarket shelf is a plurality, wherein the plurality of shooting angles correspond to a plurality of shelf images one by one;

if so, sequentially executing the step of primary classification to each shelf image of an acquired plurality of shelf images to obtain a respective primary item classification result corresponding to the items on the supermarket shelf and a respective primary price identification result corresponding to the price tags in each shelf image, and acquiring a first-level item classification result and a first-level price identification result according to a plurality of primary item classification results, a plurality of primary price identification results, a pre-trained first-level item linear regression model and a pre-trained first-level price tag linear regression model, and displaying the first-level item classification result and the first-level price identification result on the shelf image; and if judging not, skipping to the step of image acquisition, wherein after acquiring the first-level item classification result and the first-level price identification result according to the plurality of primary item classification results, the plurality of primary price identification results and the pre-trained first-level linear regression models, the analysis method further comprises:

judging whether the first-level item classification result is a similar item or not;

if the first-level item classification result is a similar item, acquiring a plurality of secondary item classification results corresponding to the similar item according to the plurality of shelf images and a pre-trained second-level item classification model, and then acquiring a second-level item classification result corresponding to the similar item according to the plurality of secondary item classification results and a pre-trained second-level item linear regression model, the second-level item classification model is a model that is constructed by the image identification technique of the convolutional neural network in advance and trained by all the similar items on the supermarket shelf;

correspondingly, displaying the second-level item classification result and the first-level price identification result on the shelf image; and if judging the first-level item classification result is not the similar item, skipping to the step of display.

2. The analysis method according to claim 1, wherein after the step of acquiring the primary item classification result corresponding to the items on the supermarket shelf, the analysis method further comprises:

acquiring an item price corresponding to the primary item classification result; and judging whether the item price is consistent with the primary price identification result or not, and if not, sending a first reminder message.

3. The analysis method according to claim 1, when the items on the supermarket shelf are fruit and fresh items, after the step of primary classification, the analysis method further comprises:

judging whether the primary item classification result is in a decayed state according to the shelf image and a pre-trained fruit and fresh item decay model corresponding to the primary item classification result; and if the primary item classification result is in the decayed state, sending a second reminder message;

wherein the fruit and fresh item decay model is a model that is constructed by the image identification technique of the convolutional neural network and trained by all the items in a decayed state on the supermarket shelf.

4. The analysis method according to claim 1, wherein after the step of primary classification, the analysis method further comprises:

judging whether the items on the supermarket shelf are in a sold-out state according to the shelf image and a pre-trained empty shelf model; and if the items on the supermarket shelf are in the sold-out state, sending a third reminder message.

5. An analysis system for items on a supermarket shelf, comprising:

an image acquisition device to acquire one shelf image, wherein the shelf image contains items on the supermarket shelf and price tags corresponding to the items, and the shelf image corresponds to one shooting angle;

a processor to acquire a primary item classification result corresponding to the items on the supermarket shelf and a primary price identification result corresponding to a price tag according to the shelf image, a pre-trained primary item classification model and a pre-trained price tag text identification model, wherein the primary item classification model is a model that is constructed by an image identification technique of a convolutional neural network and trained by all the items on the supermarket shelf, and the price tag text identification model is a model that is constructed by the image identification technique of the convolutional neural network and trained by the price tags corresponding to all the items on the supermarket shelf; and a display device to display the primary item classification result and the primary price identification result on the shelf image, the analysis system further comprises: a first judgment device used to judge whether a number of the shooting angles of the supermarket shelf is a plurality, wherein the plurality of shooting angles correspond to the plurality of shelf images one by one; a first selection device used to execute a first-level classification device when the judgment of the first judgment device is yes, and execute the image acquisition device when the judgment of the first judgment device is no; wherein the first-level classification device used to sequentially execute the step of primary result acquisition to the acquired plurality of shelf image in each of the shelf image to obtain the primary item classification result corresponding to the items on the supermarket shelf and the primary price identification result corresponding to the price tag in each of the shelf image, and acquire a first-level item classification result and a first-level price identification result according to a plurality of primary item classification result, a plurality of primary price identification result, a pre-trained first-level item linear regression model and a pre-trained first-level price tag linear regression model, and display the first-level item classification result and the first-level price identification result on the shelf image, the analysis system further comprises: a second judgment device used to judge whether the primary item classification result is a similar item or not; a second selection device used to execute the second-level classification device when the judgment of the second judgment device is yes, and execute the image acquisition device when the judgment of the second judgment device is no; wherein the second-level classification device is used to acquire a plurality of secondary item classification results corresponding to the similar item according to the plurality of shelf images and a pre-trained second-level item classification model, and then acquire a second-level item classification result corresponding to the similar item according to the plurality of secondary item classification results and a pre-trained second-level item linear regression model, the second-level classification model is a model that is constructed by the image identification technique of the convolutional neural network in advance and trained by all the similar items on the supermarket shelf.

6. The analysis system according to claim 5, further comprising:

a first reminder module to acquire an item price corresponding to the primary item classification result, to judge whether the item price is consistent with the primary price identification result or not, and to, if judged not, send a first reminder message.

7. The analysis system according to claim 5, further comprising:

a second reminder module to judge whether the primary item classification result is in a decayed state according to the shelf image and a pre-trained fruit and fresh item decay model corresponding to the primary item classification result, and to, if the primary item classification result is in a decayed state, send a second reminder message, wherein the fruit and fresh item decay model is a model that is constructed by the image identification technique of the convolutional neural network and trained by all the items in a decayed state on the supermarket shelf.

8. The analysis system according to claim 5, further comprising:

a third reminder module to judge whether the items on the supermarket shelf are in a sold-out state according to the shelf image and a pre-trained empty shelf model, and to, if the items on the supermarket shelf are in the sold-out state, send a third reminder message.

9. The analysis system according to claim 5, wherein the processor is to mark out a price tag target area corresponding to a corresponding price tag on the shelf image.

* * * * *